(12) United States Patent
Lara et al.

(10) Patent No.: US 10,142,400 B2
(45) Date of Patent: Nov. 27, 2018

(54) CONTEXT-SENSITIVE INFORMATION RETRIEVAL

(71) Applicant: Genesys Telecommunications Laboratories, Inc., Daly City, CA (US)

(72) Inventors: Juan R. Lara, Wilmington, CA (US); Saurabh Saxena, Campbell, CA (US); Eric Chan, Markham (CA); Michael Katten, El Cerrito, CA (US)

( * ) Notice: Subject to any disclaimer, the term of this patent is extended or adjusted under 35 U.S.C. 154(b) by 236 days.

(21) Appl. No.: 14/292,780

(22) Filed: May 30, 2014

(65) Prior Publication Data

US 2015/0350305 A1    Dec. 3, 2015

(51) Int. Cl.
| | |
|---|---|
| *G06F 3/00* | (2006.01) |
| *H04L 29/08* | (2006.01) |
| *G06F 9/451* | (2018.01) |
| *G06F 9/50* | (2006.01) |
| *H04W 4/18* | (2009.01) |

(52) U.S. Cl.
CPC ............ *H04L 67/10* (2013.01); *G06F 9/453* (2018.02); *G06F 9/50* (2013.01); *H04L 67/22* (2013.01); *H04L 67/306* (2013.01); *H04W 4/18* (2013.01)

(58) Field of Classification Search
CPC ............ G06F 9/54; G06F 11/302; G06F 9/50; H04W 4/18
USPC ........................................................ 719/310
See application file for complete search history.

(56) References Cited

U.S. PATENT DOCUMENTS

| | | | |
|---|---|---|---|
| 6,697,824 B1* | 2/2004 | Bowman-Amuah | ....................... G06F 17/3089 707/E17.116 |
| 7,158,965 B1* | 1/2007 | Greenberg | ............ G06F 9/4446 |
| 2003/0028513 A1* | 2/2003 | Pawar | .................... G06F 11/302 |
| 2003/0043991 A1* | 3/2003 | Kriechbaum | ......... H04M 3/493 379/218.01 |
| 2003/0122859 A1* | 7/2003 | Aggarwal | ............. G06F 9/4446 715/708 |
| 2006/0235736 A1* | 10/2006 | Guckenheimer | ..... G06F 9/4446 715/708 |
| 2010/0114691 A1* | 5/2010 | Wu | ..................... G06Q 10/0637 705/14.44 |
| 2011/0106810 A1* | 5/2011 | Huck | ................ G06F 17/30893 707/741 |
| 2012/0110450 A1* | 5/2012 | Kureshy | ............... G06F 9/4446 715/708 |
| 2014/0245141 A1* | 8/2014 | Yeh | ....................... G06F 3/0481 715/708 |

OTHER PUBLICATIONS

IBM, IBM Networking OS BBI Quick Guide, 2012.*

* cited by examiner

*Primary Examiner* — Lechi Truong (57) ABSTRACT

A help system includes receives a request from the application running on an end-user device over a data communication network. The request may be transmitted in response to a command by a user to receive help related to the application. The server receives context information associated with the request from the application. According to one embodiment, the context information includes information gathered by the application as the user interacts with the application. The server selects information to be output based on the received context information, and transmits the selected information to the application.

20 Claims, 7 Drawing Sheets

CONTEXT-SENSITIVE INFORMATION RETRIEVAL

BACKGROUND

1. Field

The present invention is in the technical area of information retrieval, and pertains more specifically to enhanced user experience based on context in retrieval.

2. Description of Related Art

One broad application of the present invention is in help systems. In the current art help systems are typically implemented in the source code of a product by insertion of unique IDs in source code to serve as connections to correspondingly marked technical documentation in a co-packaged help system. This solution is burdensome and inelegant. The burden arises in that help systems produced this way is generally bundled with the associated software deliverable. This system also generally calls for full clone and augmentation with each update to the software. Furthermore, software developers are called to closely coordinate development with help system producers. It also calls for separate localization efforts after a base help system is produced.

What is clearly needed in the art is a context-sensitive system in which the help system need not be bundled with the product, but may be accessed, for example, through a browser, initiated by a user of the product, at a web site dedicated to managing the help system, and in which help information is presented to the product user based on context, such that the information delivered may be varied depending on the context.

SUMMARY

Embodiments of the present invention are directed a system that includes a processor and memory. The memory contains instructions that, when executed by the processor, cause the processor to receive a request from an application over a data communication network. The request is transmitted in response to a command by a user to receive help related to the application. The instructions further cause the processor to receive context information associated with the request. According to one embodiment, the context information includes information gathered by the application in response to user interaction with the application. The instructions further cause the processor to select information to be output based on the received context information; and transmit the selected information to the application.

According to one embodiment, the command is transmitted in response to actuation of an option via the end-user device.

According to one embodiment, the context information identifies a role of the user in an enterprise. The enterprise may be a contact center, and the user may be a contact center agent.

According to one embodiment, the context information identifies a particular feature focused on by the application when the command is transmitted along with other context information. Substance of the information may be determined based on the particular feature focused on by the application, and presentation of the information may be determined based on the other context information.

The context information may include a version number of the application, user profile information, a language preference of the user, and the like.

According to one embodiment, the application is configured to monitor user interaction with the application for gathering the context information.

Although a help system is used as an example, a person of skill in the art should appreciated, information retrieval guided by context may be applied to many circumstances other than help systems dedicated to a specific product.

DETAILED DESCRIPTION

One embodiment of the invention is directed to help systems dedicated to specific products. Help systems are therefore used as examples in many implementations described below, but the invention is not limited to help systems.

In conventional art, help systems for software products typically involve insertion of unique IDs in source code to serve as connections to correspondingly marked technical documentation in a co-packaged help system. This solution is burdensome and inelegant. The burden arises in that help systems produced this way is generally bundled with the associated software product, and closely coordinated in use. This conventional system also generally calls for full clone and augmentation with each update to the software. Furthermore, software developers are called to closely coordinate development with help system producers.

The industry-standard process for creating help systems is for the help-system writer to first create a file containing help topics to which he or she assigns unique IDs. Then that writer creates a header file that lists the symbolic IDs and numeric IDs for the various dialog boxes and controls in a program. Software developers then embed these unique IDs in the source code to produce a link between the interactive interface through which the program operates and the help topics. Such a system generally calls for tight collaboration between the help system writer and the software developers, and creates a contingent delivery methodology that calls the writers or developers to apply the other group's unique-ID system.

According to one embodiment of a system for providing help documentation, the help system need not be bundled with the software of the application for which help may be needed by a user. Instead, depending on the focus of the application, that is, the particular command or function where a user may be currently in the application, the user may invoke help by, for example, pressing the F1 key, or any other specific input that may have been provided in a particular application. The application, in response to the signal from the "help" input, invokes a URL for a web page that manages help documentation and provides that documentation back to the application interface for the user.

The web page invoked in implementations of the invention is implemented as a PHP page (or other page with similar capability) that references an associated XML file. The PHP page accepts URL parameters from the software, which are the parameters entered by the software developers. The parameters and their associated content URLs are then transmitted to and saved within the XML file. According to one embodiment, this same PHP page is used to manage the XML file. As a developer adds new parameters to the software, the help content writer may access the PHP page to create new parameter/URL associations. Interaction between SW developers and Help Content writers in implementations of the invention devoted to help systems occurs at a form entry point to a wiki engine/database. According to one embodiment, the SW developer enters the feature name or other context information in a designated field, and the Help Content writer enters a portion of feature description URL in a corresponding field that will be used in building the full URL to be rendered at runtime. When either submits the values of these contexts, the code builds URLs to be written to the XML file for use at runtime.

According to one embodiment, the application is executed on a computerized appliance that has Internet connectivity, to be able to access the help web page to receive help documentation on demand. According to another embodiment where a large enterprise may have an extensive internal LAN, the help web page may be hosted on a server on the enterprise LAN, or be accessible via an Intranet network between different enterprise sites.

In one implementation, the computerized appliance has a processor, and software executing on the computerized appliance from a non-transitory physical medium. The software provides the application having specific functions and features operable by the user through an interactive interface, and a help function comprising help code invoked by the user activating a specific help input. According to one embodiment, the help code invokes a URL to a remote server, opens a link to the server, and transmits to the server context information including focus of the application on a particular feature at the time the help input is made by the user, a version identification of the application, and/or additional context information available to the application.

In one implementation, the help input is pressing a specific key mapped by the application for the purpose. Also in one implementation, the computerized appliance is associated with an enterprise, and the additional context information includes one or more of a role of the user in the enterprise, an identity of the user, and a language preference of the user or the application.

In another aspect, a processor hosts software providing a web site providing help content for the application. The web site operates with an HTML scripting and programming language managing an XML program. A help request received from a user of the application is accompanied by context information including focus of the application on a particular feature at the time the help request is transmitted, a version identification of the application, and/or additional context information available to the application. The web site, through the HTML scripting language, selects help content according to the context information, and invokes one or more web pages of the web site displaying the selected help content.

In one implementation, the scripting language is PHP. Also, in one implementation, the additional context information comprises one or more of a role of the user in an enterprise, an identity of the user, and a language preference of the user or the application.

Figure 1:
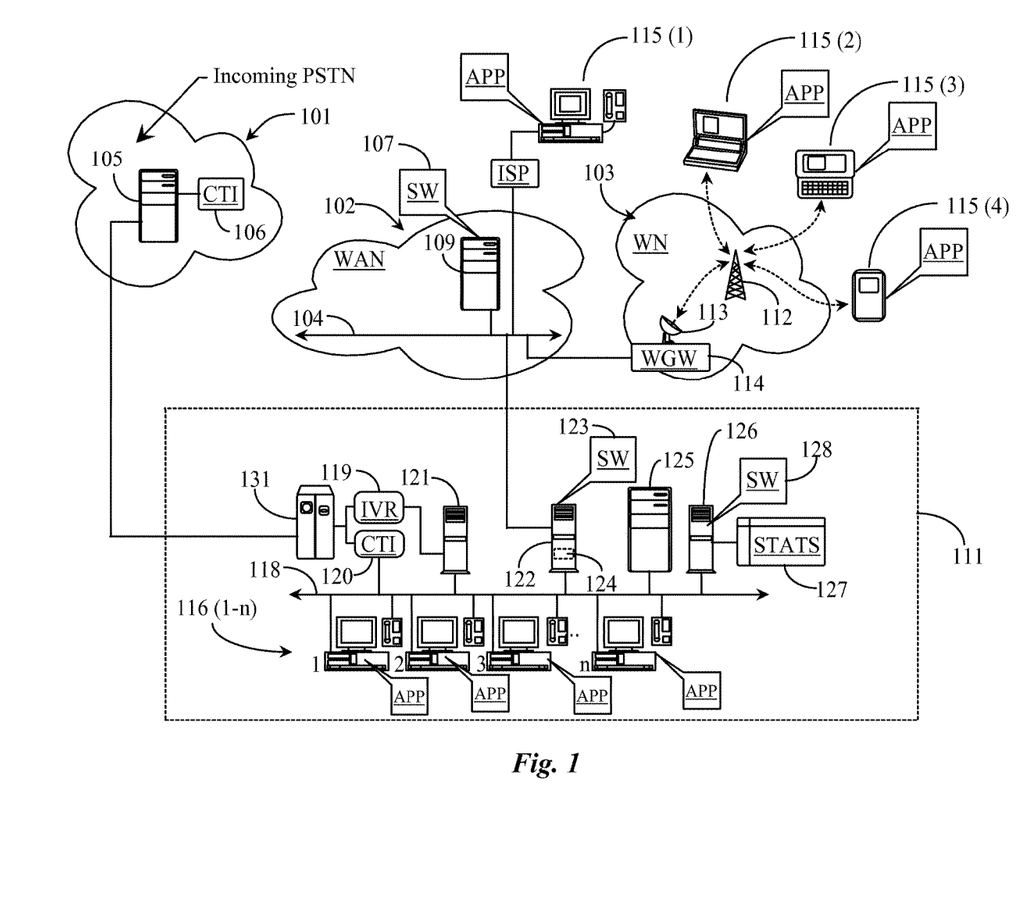
FIG. 1 is an architectural diagram illustrating equipment, software and network connectivity in practicing implementations of the present invention.

FIG. 1 is an architectural diagram illustrating equipment, software and network connectivity according to one embodiment of the invention. A PSTN network 101, a wide area network (WAN) 102, which may include the well-known Internet network according to one example, and a wireless network 103 are illustrated in FIG. 1, as well as an enterprise 111, which may in some implementations be a contact center. Incoming PSTN calls may arrive at a network switch 105 and be switched, for example, to enterprise 111 to an internal switch 131, which may have a CTI enhancement 120 and IVR functionality 119 to a server 121. The enterprise in this example operates on a Local area Network (LAN) 118.

In enterprise 111 there may be a multiplicity of workstations 116 (1-*n*) connected to LAN 118, which may be operated by agents or knowledge workers that may interact with applications that are enabled with help system operation according to implementations of the present invention. In this example, the PHP web page that enables help to agents at stations 116 (1-*n*) may be hosted on a server 125 connected to LAN 118. Alternatively, a gateway server 122 having a processor 124 and executing software 123 may provide Internet connectivity to workstations 116 (1-*n*), and calls for help from the workstations may be directed to a web page on the Internet, such as a web page hosted on a server 109 in Internet 102, through SW 107.

A computer 115(1), which may for example be operated by a user from a home or small business may connect to Internet 102 via an ISP as shown, and may execute an application (App) according to an implementation of the present invention. In this case computer 115(1) may invoke a web page at server 109 for help documentation.

In another aspect a laptop computer 115(2), a pad device 115(3) or a smart phone 115(4), or other such computerized appliances (collectively referred to as an end-user device) may connect to Internet 102 through a wireless network 103, by a base station 112 and through a gateway 113 to Internet backbone 104, and these devices may execute applications (App) enabled according to implementations of the invention, and solicit to and receive help documentation from a web page according to an implementation of the invention hosted on server 109.

FIG. 1 illustrates several ways that applications according to implementations of the invention may be executed on computerized appliances connected through networks connecting to a web page that may manage help content in implementations of the invention.

Figure 2:
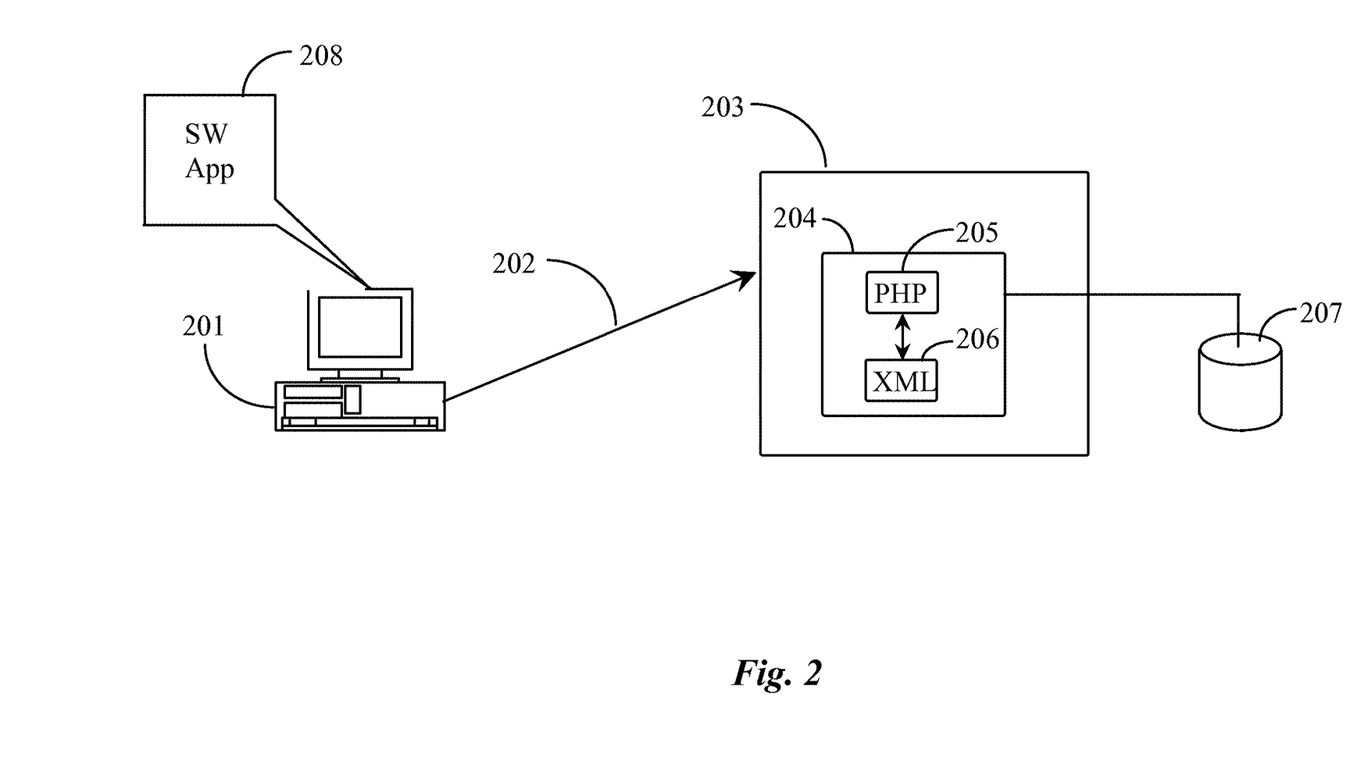
FIG. 2 is a diagram illustrating connectivity and operation for help systems in implementations of the present invention.

FIG. 2 is a diagram illustrating connectivity and operation for help systems in implementations of the present invention. A computerized appliance 201 represents any one of workstations 116, computer 115(1) or devices 115(2), 115(3) or 115(4), or any other computerized appliance that may execute an application according to an implementation of the present invention. According to one embodiment, appliance 201 executes application 208. Link 202 represents network connectivity from the computerized appliance executing the application to a server 203 which may be in the well-known Internet network, or may be connected in an enterprise. Link 202 may follow any path in FIG. 1 between an appliance executing an application according to embodiments of the present invention, and a server hosting a web page implemented according to embodiments of the present invention. Server 203 in this example hosts a web page 204 which has a PHP engine 205 enabled to manage an XML program 206 by which help content in a data repository 207 may be stored, retrieved and provided to users operating the application at 201. In some implementations of the invention, the XML file, using context information, services help requests by directing to lower-level pages of the web site, in which pages specific help content is displayed back to the user that initiated a help request.

According to one embodiment, application 208 in FIG. 2 provides an interactive interface on a monitor for a user operating the appliance and the application, and the application may, at any point in time, focus on a particular feature of the application. For example, the user may at one point invoke a particular command provided by the application, and may desire to access help for that feature. In implementations of the invention the person may press a specific help key, which may, for example, be the F1 key.

In response to the user pressing the F1 key in this example, the application opens link 202 to server 203 and web page 204. The application may further, transparently to the user, provide to the web page identification of the application, including at least the version of the application being executed on appliance 201, and other context information. According to one embodiment, the context data may be used by the server 203 for filtering or deciding help information to be provided to the user.

For example, computer 201 may be a workstation in a contact center manned by an agent as an employee of the contact center. The agent may log into the workstation and the application with identity and perhaps a role in the enterprise. The user may be assigned to a particular operation, like an outbound campaign, and may have particular skills, which may be made available to the application, or which information the application may be enabled to access. For example, the user may have the role of a supervisor. The user may also have certain language skills. The data known about the user of the application may be transmitted as context data to the server.

According to one embodiment, context of usage of the particular application may be kept as history data and stored in a database in association with the user. The user's sequence of interaction with the application may be tracked and also stored as an item of context. In some applications, the user may have made annotations to a document or edits to a graphic, and these actions may be used as an item in context as well. Another aspect of context may be the user's account profile. For example, the user may be a manager or an IT expert, and the role may be used as an item in context. The user might have multiple roles in an enterprise. There may also be permissions, and the user with root permissions may be permitted to see more detail in help.

According to one embodiment, all of the information available to the application, and which the application is enabled to access and to provide to web page 204 via link 202, may be referred to as context. One feature in implementations of the present invention is this ability to provide context. According to one embodiment, the Web page 204, through the PHP engine 205 and XML program 206, is enabled to consider the context when help is invoked by the user, and may select help content from data repository 207 according to context. For example, if the user is a supervisor, the content provided may be different than in cases where the user is not a supervisor. If the version of the application is in a particular language, the web page may automatically identify the particular language and select help content in the appropriate language. In this latter scenario, the content of the information is the same, but the presentation differs based on context.

Figure 3:
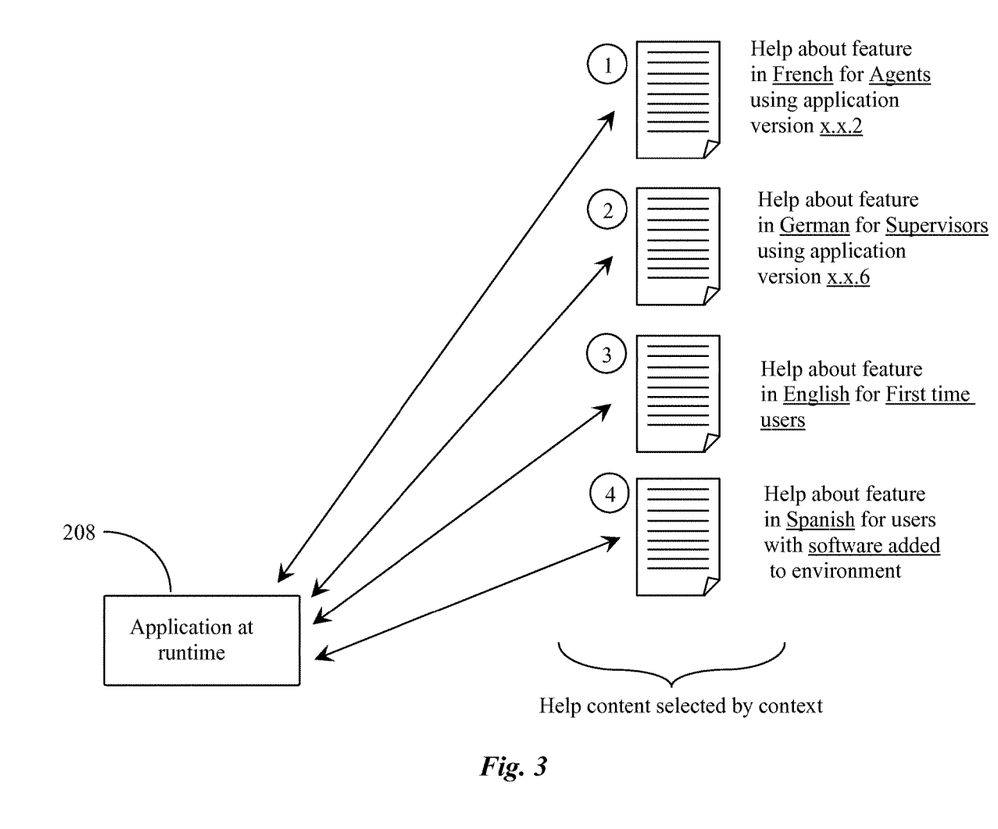
FIG. 3 is a diagram illustrating help content selection by context.

FIG. 3 is a conceptual diagram illustrating help content selection by context. In the example of FIG. 3, the application 208 requests help from the server 203. According to one embodiment, the request includes context information gathered about the user and the application. The context information is provided to the web page 204. According to one embodiment, the Web page 204 uses the context information to select help content. Four examples are shown in the embodiment of FIG. 3, where context is identified as underlined text. In example (1), the context indicates that the user is an agent, the language is French, and the application version is x.x.2. Accordingly the web page retrieves help content from data repository 207 appropriate to the context, and delivers that content to the user.

In example (2) the context indicates German language, the user is a Supervisor and the application version is x.x.6. Appropriate content is retrieved and delivered.

In example (3) the context is English and the user is a first time user. Again, appropriate content is retrieved and delivered.

In example (4) the language is Spanish and context further indicates that software has been added. The appropriate content is retrieved and delivered based on this information.

According to one embodiment of the invention, software developers who create, maintain, and update an application developed as an implementation of the present invention are not tethered to the technical writers who create help content for the application. According to this embodiment, the software developers have no obligation to provide unique IDs in their source code to coincide with like IDs with which help content is tagged, and help content and function are not bundled with the software of the application. According to one embodiment, the software of the application is one code set, and the help system is a separate system functioning on a separate computerized appliance as a web page accessible over network connection from the appliance executing the software for the application. One advantage of this unique arrangement is that it allows for minimal changes to the help system when the application is updated to a new and different version.

Another advantage is that software developers need not embed help content IDs in the source code. According to one embodiment, one URL is invoked when a user presses the "help" key (or other signal initiation) and the application opens a link to the web page that may be at a remote location. The initiation may be a specific key, or in the case of touch screens might be, for example, the user making a specific signal in touch, such as a double-touch, or drawing an approximation of a question mark. Context information is passed to the web page after the link is established, and the web page uses the context information to select appropriate content to be passed by the link to the application to be displayed for the user.

In development of a new application according to an implementation of the invention, or upgrading of an existing application, a design specification for the software provides description of functionality for various features of the new application, or new or altered features of the existing application being upgraded. The design specification may also define context parameters for the application or new features of an existing application. The context parameters may be provided to, and may be used by, the software developers to provide specific versions for different contexts.

According to one embodiment, the same design specification may be provided to the technical writers responsible for help content, along with the context parameters, and the help system writers may follow the design specification to prepare help content for all features and contexts. The software developers and help content writers may work substantially independently, with perhaps periodic interaction to gauge progress and impose quality control. When an application is released, help content may be loaded to the data repository 207 associated with the web page.

As discussed above, according to one embodiment of the invention, the PHP page 205 references the associated XML file 206. The PHP page accepts URL parameters that developers enter. The parameters and their associated content URLs are then transmitted to and contained within the XML file. This same PHP page is used to manage the XML file. As the developer adds new parameter to the software, the writer comes to the PHP page to create new parameter/URL associations.

Another advantage of help systems according to implementations of the invention is that testability is rendered more efficient. The online help pages that serve up context-specific help content are based on meaningful URLs that contain aspects of the contexts, dynamically produced from the coordinating XML file. These URLs, listed in the XML file, provide an ability to test the full list of potential contexts, via output from that XML file, against the full list of contexts proposed by the software source code. The system lends itself to a self-checking test harness.

In another aspect, contexts may be hierarchical. For example, if a granular context help page is provided by the server 203, the page itself might produce a type of breadcrumb to lead the reader to a higher-level context without having to return to the software interface. In this regard, the dynamism of the context-hierarchy creation can be translated to the user experience along with user-specific contexts themselves.

In yet another aspect of the invention, the server 203 may be provided with additional machine intelligence such that statistics and historical data may be collected and stored, and intelligence may be provided to provide further granularity in context. For example, when a help request is fielded from a specific user, that user's history might be accessed, and the server 203 may use the history to amend the default manner in which content is selected to be displayed for that user. In some cases, additional information may be added to content displayed for a user, such as a summary of that user's history with the system. Additionally, users might be solicited for feedback that may be provided to content writers and software developers for use in future development.

The implementations described above with reference to help systems devoted to specific products is but one of various application of the present invention. In some implementations, information retrieval guided by context might not be dedicated to a specific product, or be initiated through a specific product.

One implementation may be in regard to Frequently Asked Questions (FAQ) lists, a technique used extensively in interactive circumstances. Many on-line information sources and enterprises post an interactive FAQ list to aid users in better understanding of a product or a system. By selecting a question, an answer is provided to the user. In an implementation of the present invention, context may be available to the system managing the interactive FAQ sheet, and different answers to the same question may be provided to a user based on a variety of different facts in the context surrounding the question. For example, the FAQ system may access to the identity of the user, facts from the user profile, time of day, circumstances regarding load on the FAQ process at the time the inquiry is made, the user's history with the FAQ system, and any number of other facts and circumstances that may be consulted as context, to tailor responses.

Another exemplary use of the system may be transitive reference from one document to another in a context sensitive manner. In another example, execution of a search system may be tailored based on user-related context. A search may be conducted in a number of ways, and may search a variety of sources, guided by user-related context, such as user profile, history, and so on, similar to providing help based on context.

Another implementation may be in the circumstance of a user accessing a document or a graphic composed by another person using a certain program, such as Adobe Illustrator™ for a graphic, or Microsoft Word™ for a document. Context sensitive help might be provided specific to the program the other person used in creating the document or file being displayed or otherwise accessed. As a simple example, in reviewing a document in MS Word™ the document may be tagged in a way that the person using the document may access help in the program used to create the document, where the help is focused according to context.

According to one embodiment, a process executed by the server 203 in providing context-sensitive information may be described in terms of the following acts. The process starts, and the server receives a request from the application running on an end-user device 115 over a data communication network. According to one embodiment, the application detects selection of a command to receive help related to the application. The command may be, for example, actuation of a particular button or option of the end-user device 115. In response to the command, the application retrieves all or part of the context data being monitored so far, identifies the address of the server, and generates the request to be transmitted to the server.

The server receives from the application the context information transmitted along with the request. The server selects information to be output based on the received context information, and transmits the selected information to the application.

According to one embodiment, the context information identifies a role of the user in an enterprise (e.g. supervisor). The enterprise may be a contact center, and the user may be a contact center agent. The context information may also include a version number of the application, user profile information, a language preference of the user, and the like.

According to one embodiment, the context information identifies a particular feature focused on by the application when the command is transmitted along with other context information. The particular feature may be a particular portion of the application invoked by the user, an area of the application hovered-over or selected by the user, an area of the application identified via cursor placement, a particular link provided by the application, an area of the application highlighted by the user, and/or the like. Substance of the information may be determined based on the particular feature focused on by the application, and presentation of the information may be determined based on the other context information. For example, although the same help content may be provided based on the area that is focused by the application, the language, font, graphics, layout, and other presentation aspects of the help content may vary based on user profile data detected by the server 103. In another embodiment, the substance of the help content also differs based on the context information.

Each of the various servers, controllers, switches, gateways, engines, and/or modules (collectively referred to as servers) in the afore-described figures may be a process or thread, running on one or more processors, in one or more computing devices 1500 (e.g., FIG. 4A, FIG. 4B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 4A:
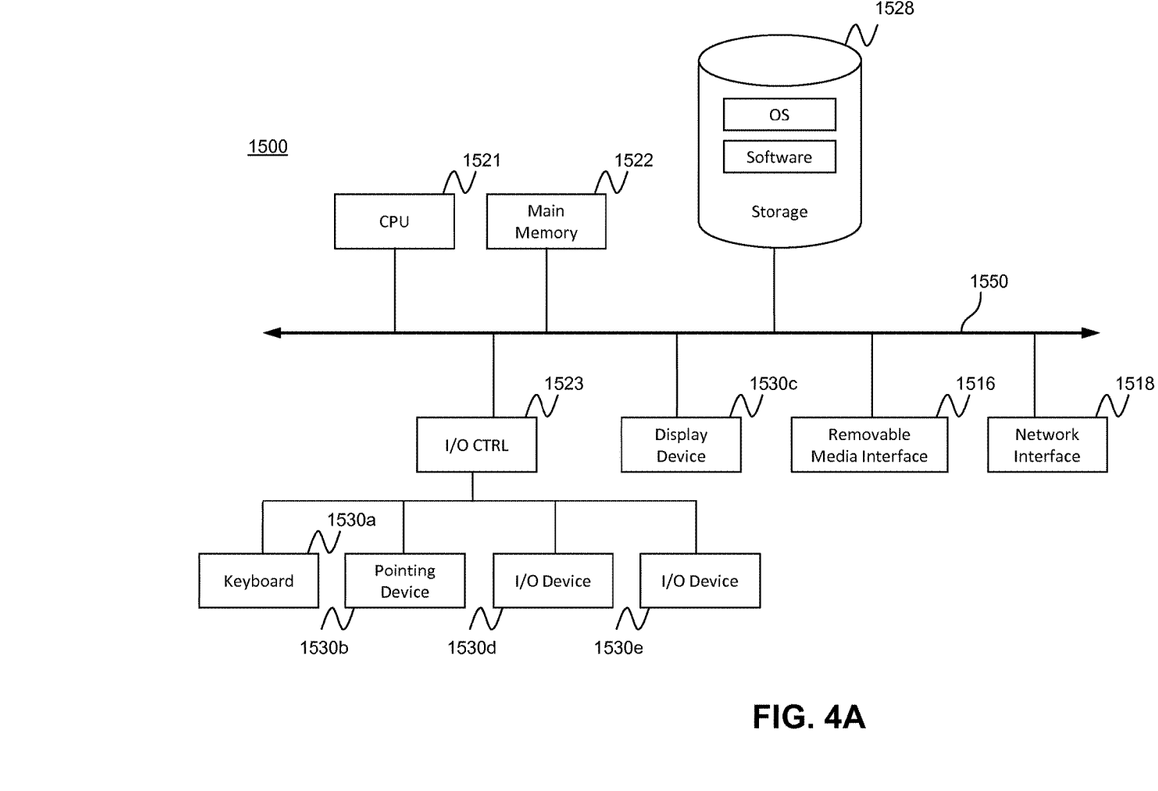
FIG. 4A is a block diagram of a computing device according to an embodiment of the present invention.
Figure 4B:
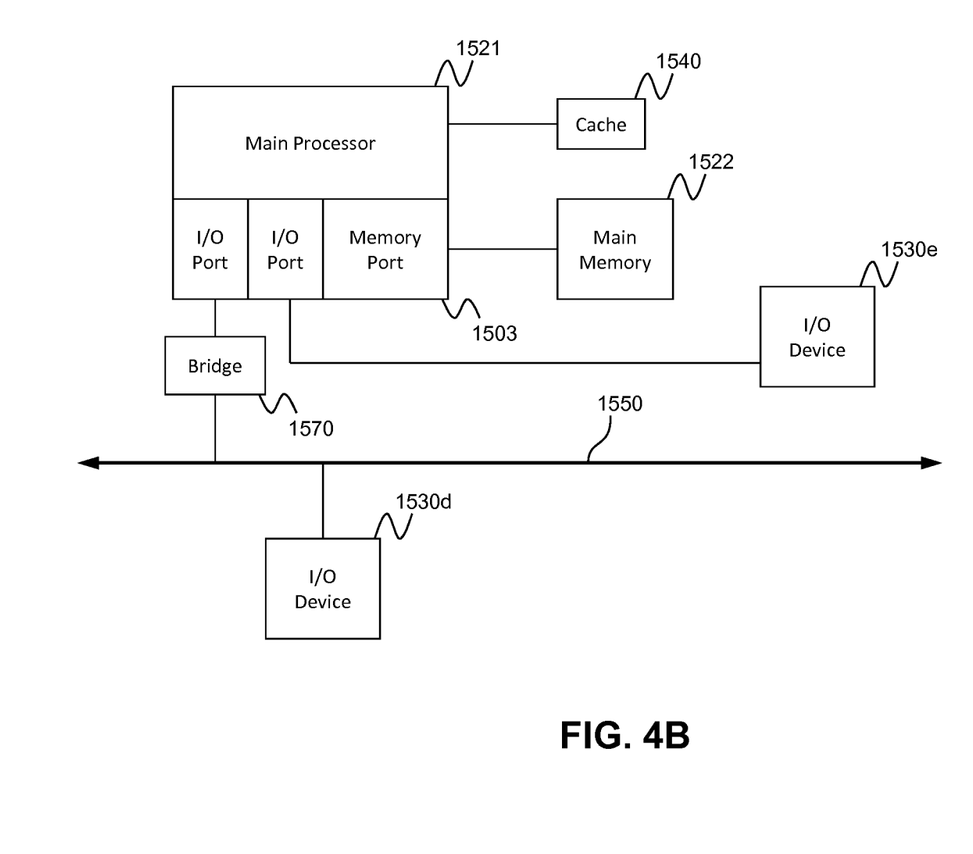
FIG. 4B is a block diagram of a computing device according to an embodiment of the present invention.

FIG. 4A and FIG. 4B depict block diagrams of a computing device 1500 as may be employed in exemplary embodiments of the present invention. Each computing device 1500 includes a central processing unit 1521 and a main memory unit 1522. As shown in FIG. 4A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 4B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 4A, the central processing unit 1521 communicates with the main memory 1522 via a system bus 1550. As shown in FIG. 4B, the central processing unit 1521 may also communicate directly with the main memory 1522 via a memory port 1503.

FIG. 4B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 4A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 4B depicts an embodiment of a computer 1500 in which the central processing unit 1521 communicates directly with I/O device 1530e. FIG. 4B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 4A, may control the I/O devices. The I/O controller may control one or more I/O devices such as a keyboard 1530a and a pointing device 1530b, e.g., a mouse or optical pen.

Referring again to FIG. 4A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530*c*, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect or otherwise use the display devices 1530*c*. In one embodiment, a video adapter may comprise multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 4A and FIG. 4B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 4C:
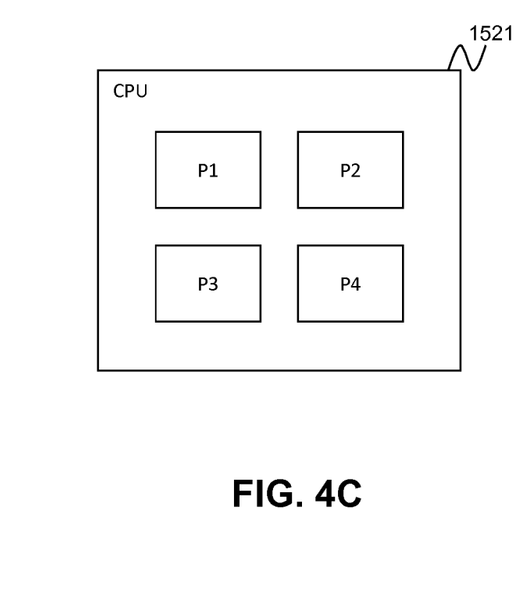
FIG. 4C is a block diagram of a computing device according to an embodiment of the present invention.
Figure 4D:
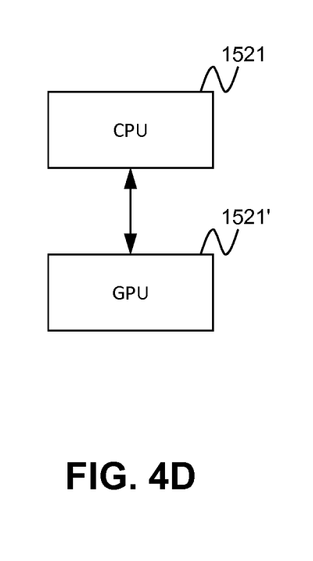
FIG. 4D is a block diagram of a computing device according to an embodiment of the present invention.

As shown in FIG. 4C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 4D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 4E:
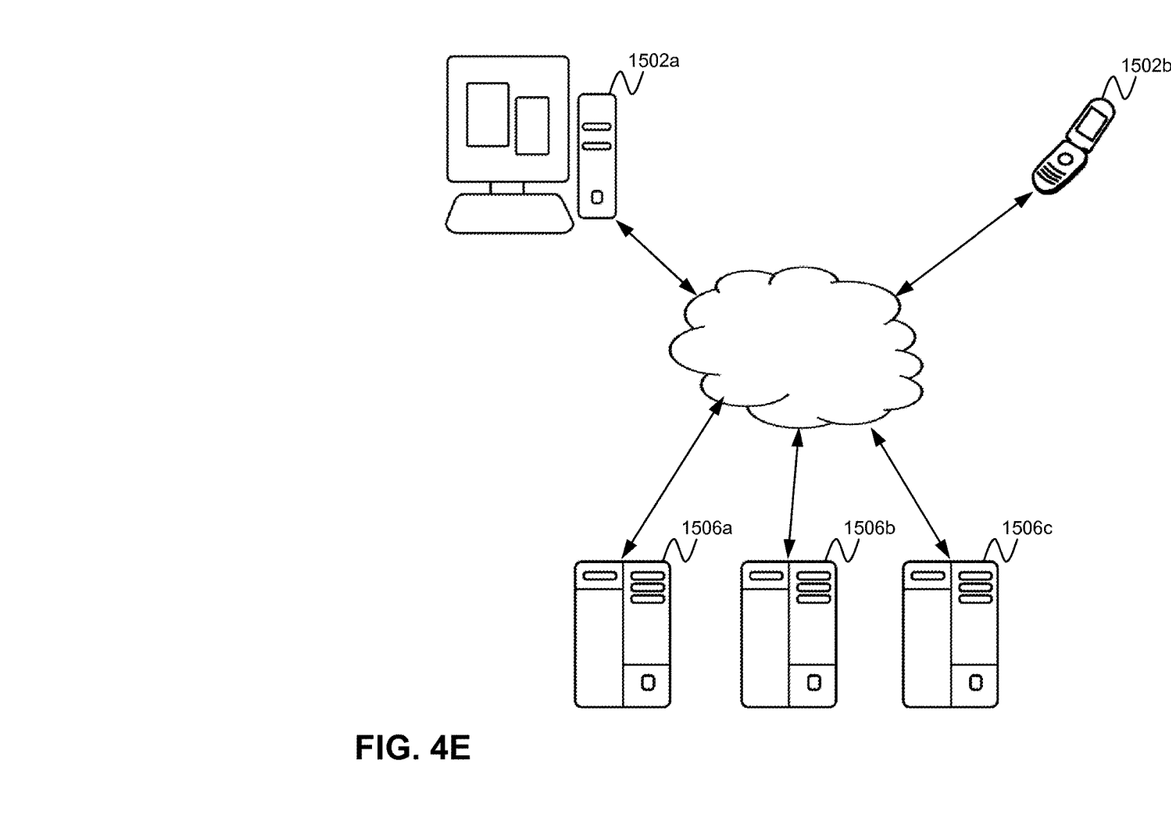
FIG. 4E is a block diagram of a network environment including several computing devices according to an embodiment of the present invention.

A computing device may be one of a plurality of machines connected by a network, or it may comprise a plurality of machines so connected. FIG. 4E shows an exemplary network environment. The network environment comprises one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 4E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device

1500 to any type of network capable of communication and performing the operations described herein. An I/O device 1530 may be a bridge between the system bus 1550 and an external communication bus.

According to one embodiment, the network environment of FIG. 4E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

The skilled person will understand that the implementations and description above is entirely exemplary, and that features of the system of the invention may be provided in other ways than specifically those examples described herein. There are many alterations that may be made in code, for example, to accomplish the same or very similar features in a computer-implemented invention. There are similarly possible alterations in the sequence of events that may be followed in providing the features of a system according to this invention, and the systems with different sequence are still implementations of the same invention. The scope of the invention is limited only by the claims that follow.

The invention claimed is:

1. A system comprising:
   a processor; and
   a memory, wherein the memory contains instructions that, when executed by the processor, cause the processor to:
   receive from a first entity, over a wide area network, feature information for a feature of an application;
   store the feature information in a first field of a first file;
   receive from a second entity different from the first entity, over the wide area network, an address to a help topic associated with the feature information;
   store the address in association with the feature information, in a second field of the first file;
   receive a request from an application over a data communication network, wherein the request is transmitted in response to a command by a user in a contact center to receive help related to the feature of the application;
   receive context information associated with the request, wherein the context information includes information gathered by the application in response to user interaction with the application, the context information including information on the user accessing the application and an identification of the feature, the context information further including user profile information, the user profile information including a language preference of the user;
   select information to be output based on the received context information, wherein the instructions that cause the processor to select information to be output include instructions that cause the processor to:
   retrieve over the wide area network the first file storing the address associated with the feature identified in the received context information;
   invoke the address in the first file stored in association with the feature identified in the received context information, and retrieve, over the wide area network, help content identified by the address, the help content being stored in a second file different from the first file;
   identify, based on the received context information, information specific to the user accessing the application;
   customize the retrieved help content based on the identified information specific to the user; and
   transmit to the application, as the selected information, the customized help content.

2. The system of claim 1, wherein the command is transmitted in response to actuation of an option at an end-user device associated with the user.

3. The system of claim 1, wherein the context information identifies a particular feature focused on by the application when the command is transmitted along with other context information, wherein substance of the information is determined based on the particular feature focused on by the application, and presentation of the information is determined based on the other context information.

4. The system of claim 1, wherein the context information includes a version number of the application.

5. The system of claim 1, wherein the context information includes user profile information.

6. The system of claim 1, wherein the application is configured to monitor a sequence of user interactions with the application for gathering the context information.

7. The system of claim 1, wherein the user is an employee of the contact center, and wherein the role of the user is one of an agent or a supervisor of the contact center.

8. The system of claim 7, wherein the context information includes information on one or more of an outbound campaign operated by the contact center, or skills assigned to the user for the outbound campaign.

9. The system of claim 1, wherein selecting information to be output based on the role of the user in the contact center comprises:
   based on the role of the user in the contact center, determining permissions of the user to access different help content; and
   selecting information that is accessible to the user based on the determined permissions of the user.

10. The system of claim 1, wherein the instructions that cause the processor to customize the help topic include instructions that cause the processor to add to the help topic information stored in association with the user.

11. The system of claim 1, wherein the instructions that cause the processor to customize the help topic include instructions that cause the processor to customize presentation of the help topic.

12. The system of claim 1, wherein the customizing the retrieved help content is based on the user's history.

13. A method comprising:
   receiving from a first entity, over a wide area network, feature information for a feature of an application;
   storing the feature information in a first field of a first file;
   receiving from a second entity different from the first entity, over the wide area network, an address to a help topic associated with the context information;
   storing the address in association with the feature information, in a second field of the first file;
   receiving a request from an application over a data communication network, wherein the request is transmitted in response to a command by a user in a contact center to receive help related to the feature of the application;

receiving context information associated with the request, wherein the context information includes information gathered by the application in response to user interaction with the application, the context information including information on the user accessing the application and an identification of the feature, the context information further including user profile information, the user profile information including a language preference of the user;

selecting information to be output based on the received context information;

retrieving over the wide area network the first file storing the address associated with the feature identified in the received context information;

invoking the address in the file stored in association with the feature identified in the received context information, and retrieving, over the wide area network, help content identified by the address, the help content being stored in a second file different from the first file;

identifying, based on the received context information, information specific to the user accessing the application;

customizing the retrieved help content based on the identified information specific to the user; and transmitting to the application, as the selected information, the customized help content.

14. The method of claim 13, wherein the context information identifies a particular feature focused on by the application when the command is transmitted along with other context information, wherein substance of the information is determined based on the particular feature focused on by the application, and presentation of the information is determined based on the other context information.

15. The method of claim 13, wherein the context information includes one of a version number of the application or user profile information.

16. The method of claim 13, further comprising monitoring, using the application, a sequence of user interactions with the application for gathering the context information.

17. The method of claim 13, wherein the user is an employee of the contact center, and wherein the role of the user is one of an agent or a supervisor of the contact center.

18. The method of claim 17, wherein the context information includes information on one or more of an outbound campaign operated by the contact center, or skills assigned to the user for the outbound campaign.

19. The method of claim 13, wherein selecting information to be output based on the role of the user in the contact center comprises:

based on the role of the user in the contact center, determining permissions of the user to access different help content; and     selecting information that is accessible to the user based on the determined permissions of the user.

20. The method of claim 13, wherein the first file comprises an extensible markup language (XML) program referenced by an associated hypertext preprocessor (PHP) programming engine.

\* \* \* \* \*